W. WILDER.
SHUTTLE FOR LOOMS.
No. 46,040.                    Patented Jan. 24, 1865.
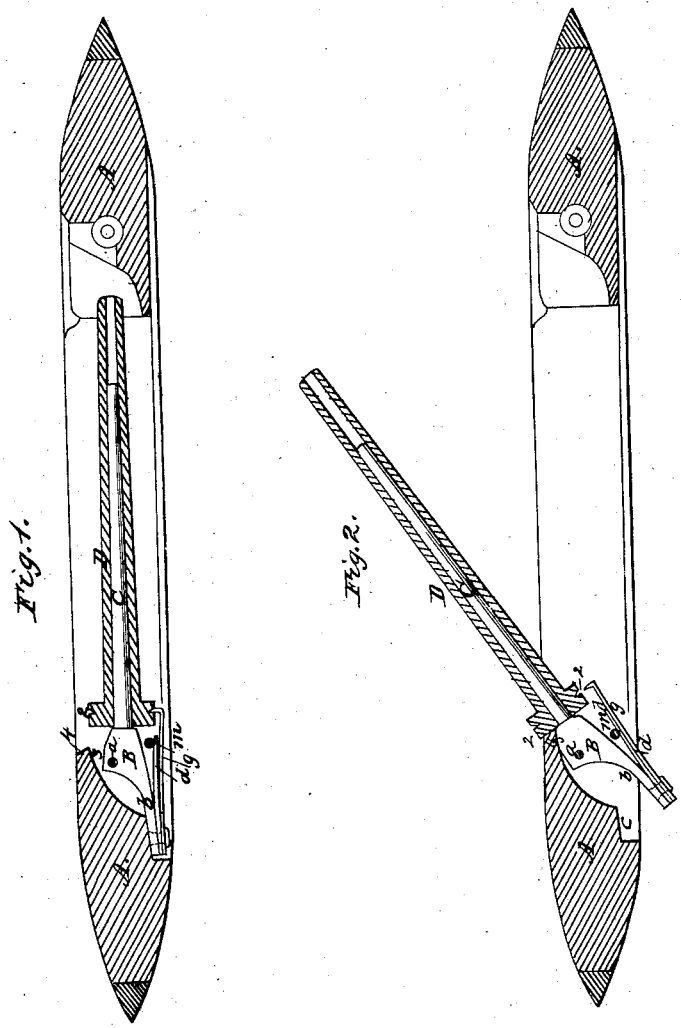
Witnesses.                      Inventor.
Geo. H. Miller.                 Warren Wilder
C. A. Wood.                     by his Attorney
                                Thos. H. Dodge

UNITED STATES PATENT OFFICE.

WARREN WILDER, OF WILKINSONVILLE, MASSACHUSETTS.

SHUTTLE FOR LOOMS.

Specification of Letters Patent No. 46,040, dated January 24, 1865.

*To all whom it may concern:*

Be it known that I, WARREN WILDER, of Wilkinsonville, in the county of Worcester and State of Massachusetts, have invented certain new and useful Improvements in Shuttles for Looms; and I do hereby declare that the following is a full, clear, and exact description of the construction and operation of the same, reference being had to the accompanying drawings, in which—

Figure 1, represents a longitudinal vertical section through said shuttle. Fig. 2, represents a similar section showing the spindle and shuttle in an elevated position.

My invention consists in combining two springs with and both on the same side of the spindle head and which are arranged in such a manner that one exerts an independent pressure on the spindle head to keep the spindle in its position and the other an independent pressure on the bobbin head for the purpose of retaining the latter upon the spindle, but that both are acted upon simultaneously, when the spindle is raised to remove or replace the bobbin, and that by said movement the bobbin spring is automatically disengaged from the bobbin head.

To enable others skilled in the art to make and use my invention, I will proceed to describe its construction and operation.

A, represents the body of the shuttle, B represents the spindle-head which is pivoted to the shuttle at $a$.

C represents the spindle and D the bobbin.

The spindle head B, has an extension shank $b$, which rests in a recess $c$, of the shuttle and which bears with its upper side on the shuttle wood against which it is pressed by the action of the spindle spring.

$d$, and $g$, represent two springs which are secured to the same side of the shank $b$, of the spindle head, they are entirely separate springs which act independently of each other, the spring $d$, bears against the pin $m$, and serves to keep the spindle and bobbin in their horizontal positions, the spring $g$, which has a catch at its end serves to retain the bobbin on the spindle, its catch entering a groove 2, on the bobbin head. I thus use two separate springs for the two functions and am enabled to make each spring just of the desired strength and no stronger than is necessary for its particular function; this is very essential in the construction of shuttles, for if the spring $g$, for instance would be made to serve both purposes of keeping the spindle down in the shuttle and of retaining the bobbin on the spindle, it would have to be made so strong as to cause great friction upon the bobbin head. I am well aware that two independent springs have been used heretofore for the same purpose, but they were always applied to different sides of the shuttle or spindle head, by applying them both to the same side of the spindle head or shuttle I use one fastening only and I have to cut out one recess only in the shutle wood for the springs to rest or operate therein and I thus save considerable labor and expense in manufacturing the shuttle. In raising the spindle to remove or replace the bobbin the two springs $d$, and $g$, are both forced out simultaneously by coming in contact with the pin $m$, and the spring catch $g$ thus releases the bobbin head and the bobbin can be readily withdrawn. The latter position of the parts is represented in a longitudinal vertical section at Fig. 2. In that position the spindle head rests against the part 3, of the shuttle wood and the bobbin head is supported by the inclined edge 4 of the shuttle wood.

Having thus fully described the nature of my invention, what I claim herein as new and desire to secure by Letters Patent is:

The combination and arrangement of the springs $d$, $g$, when secured to the spindle shank $b$, with cross pin $m$ for operating the same substantially as herein described.

WARREN WILDER.

Witnesses:
THOS. H. DODGE,
J. HENRY HILL.